(No Model.)
J. H. CROSKEY & J. LOCKE.
INSULATOR FOR ELECTRIC CONDUCTORS.
No. 530,399.            Patented Dec. 4, 1894.
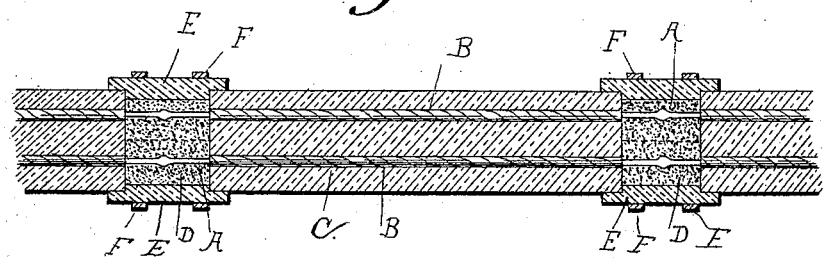
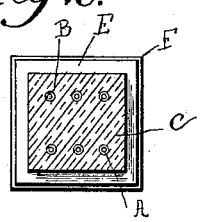
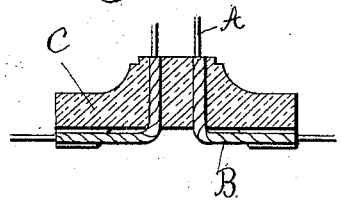
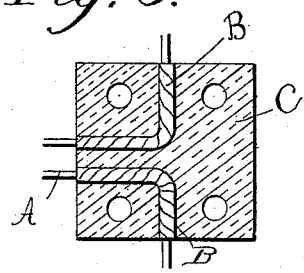
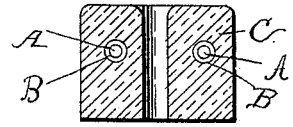
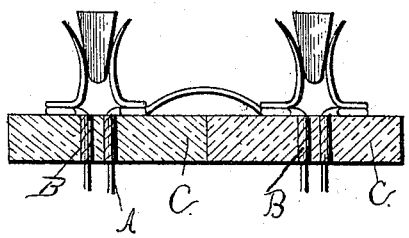
Witnesses:
J. B. McGinn.
Wm. McCarthy
Inventors
John H. Croskey
and Joseph Locke
by Connolly Bros.
Attys

UNITED STATES PATENT OFFICE.

JOHN H. CROSKEY AND JOSEPH LOCKE, OF PITTSBURG, PENNSYLVANIA.

INSULATOR FOR ELECTRIC CONDUCTORS.

SPECIFICATION forming part of Letters Patent No. 530,399, dated December 4, 1894.

Application filed September 28, 1894. Serial No. 524,365. (No model.)

*To all whom it may concern:*

Be it known that we, JOHN H. CROSKEY and JOSEPH LOCKE, citizens of the United States, residing at Pittsburg, in the county of Allegheny and State of Pennsylvania, have invented certain new and useful Improvements in Insulation for Electric Conductors; and we do hereby declare the following to be a full, clear, and exact description of the invention, such as will enable others skilled in the art to which it appertains to make and use the same.

This invention has relation to insulation for electric conductors and has for its object the provision of insulation of a novel character, which will not only perfectly insulate the wire or other conductor and prevent the escape of electricity, but will protect the wire from the action of the atmosphere or any deleterious chemical action or physical injury.

In carrying our invention into effect we coat or cover the conductor, or conductors, with a non-conducting material of high refractory or incombustible properties, such as asbestos, and superimpose on the asbestos or similar material a coating of molten glass so as to completely inclose and tightly embrace the conductor or conductors. A single conductor may be insulated in the above manner or any number of conductors may be separately coated with asbestos and carried in a single section of glass, but kept separate and apart by the intervening glass, or the conductors may be bunched or grouped, as in a cable, and insulated each from the other by any suitable substance, and the whole bunch or group coated or covered with asbestos and then coated with glass.

Where the conductor or conductors only require special insulation for short lengths, as for interior wiring, or for lighting, telegraph, power, or similar fittings or accessories, the glass covering may be made in a single length, piece, or section, but where it is desired to insulate a conductor or conductors for a considerable length such, for instance, as underground mains, we form the conductor or conductors with our insulation in a number of lengths and, after having suitably connected the abutting ends of the conductors, as by electric welding, we coat the joined ends of the conductors with an insulating material and then inclose the joint in two half sections of glass that overlap the adjacent ends of the glass covering of the conductors and thus form a tight and secure joint at the junction of each length.

Our invention consists in the improved insulation for electrical conductors herein described and claimed.

In the accompanying drawings Figure 1 is a vertical longitudinal section of a compound conductor containing several strands or wires, the whole being made up of several lengths joined together. Fig. 2 is a vertical transverse section of the same. Figs. 3, 4, 5, and 6 are sectional views of various fittings or accessories used in electric lighting and power transmission, all constructed according to our invention.

In forming the lengths of the compound conductor illustrated in Fig. 1 of the drawings, we wrap or otherwise inclose the wires, A A, in asbestos or other refractory non-metallic material, B B, and lay the wires flat upon a heated table or other support. We then pour the glass C upon the table over the wires and, by means of a suitable roller or rollers, roll and press the molten glass upon and around the wires. By using a table or support having its surface grooved to coincide with spaces between the wires the glass may be pressed between the wires and then reversed and the projecting ridges rolled down upon and over the wires so as to completely embed the same in a solid mass of glass.

After the wires have been inclosed in the glass as described, the several lengths are laid in a suitable trough, trench or conduit and the abutting ends of the wires welded together, preferably by the well known process of electric welding. The welded ends are then surrounded by a suitable insulating material D, which may be plaster of paris or other plastic, and the joint finally inclosed in half sections of glass E E, which overlap the adjacent ends of the glass sections C C, and are held in position by bands or straps F F, or other suitable fastening devices.

In the manufacture of the fittings shown in Figs. 3, 4, 5, and 6, the conductors A A, are coated or wrapped with the asbestos B B, and then placed in suitable molds and the glass C is pressed around the conductors, firmly embracing and holding them in position. The advantage of employing a conductor coated with asbestos is that the glass will adhere more closely and firmly to the asbestos than it would to the naked wire and there is much less liability of the glass cracking through inequality of expansion and contraction when the glass is first applied and also when, through excess of current, the wire becomes heated when in use.

Having described our invention, we claim—

1. An insulated conductor of electricity consisting of a metallic conductor covered with a non-metallic mineral and embedded in glass.

2. An insulated electrical conductor consisting of a metallic strand covered with asbestos and embedded in glass.

3. An electrical conductor consisting of lengths of glass having asbestos coated wires embedded therein, the adjacent ends of the wires being welded together and covered with a plastic non-conductor, substantially as described.

In testimony whereof we affix our signatures in presence of two witnesses.

J. H. CROSKEY.
JOSEPH LOCKE.

Witnesses:
C. E. SUCCOP,
JNO. M. MCDONALD.